ABSTRACT

United States Patent
Conrady et al.

[15] 3,679,703

[45] July 25, 1972

[54] SAND CORE AND MOLD COMPOSITIONS CONTAINING GLYCERINE AND AN AMMONIUM SALT

[72] Inventors: James A. Conrady, Amherst; John S. Fitzpatrick, Lorain, both of Ohio

[73] Assignee: The B. F. Goodrich Company, New York, N.Y.

[22] Filed: Oct. 16, 1970

[21] Appl. No.: 81,562

[52] U.S. Cl. ...........................260/334 R, 260/37 N, 260/41 A
[51] Int. Cl. ..................C08f 45/28, C08f 45/56, C08f 45/58
[58] Field of Search...................260/37 EP, 37 N, 41 A, 33.4; 164/43

[56] References Cited

UNITED STATES PATENTS

| | | | |
|---|---|---|---|
| 3,007,893 | 11/1961 | TePas | 260/41 |
| 3,007,890 | 11/1961 | Twiss | 260/38 |
| 2,912,406 | 11/1959 | Less | 260/31.8 |
| 3,137,669 | 7/1964 | Bragaw | 260/33.4 |

*Primary Examiner*—Morris Liebman
*Assistant Examiner*—Richard Zaitlen
*Attorney*—J. Hughes Powell, Jr. and Ernest K. Bean

[57] ABSTRACT

Dielectric baked sand cores and molds containing amine salts of copolymers of acrylonitrile and acrylic acid have improved resistance to humidity when these compositions also contain small amounts of an ammonium salt and glycerine.

7 Claims, No Drawings

SAND CORE AND MOLD COMPOSITIONS CONTAINING GLYCERINE AND AN AMMONIUM SALT

BACKGROUND OF THE INVENTION

Sand core and mold compositions comprising mixtures of sand and amine salts of copolymers of acrylic acid and acrylonitrile are disclosed in U.S. Pat. No. 3,007,893. Excellent sand cores and molds are obtained when such compositions are baked for several hours in an air oven. In foundry practice, it has been found desirable to use dielectric ovens to bake the cores and molds since this may be accomplished in only a few minutes as compared to several hours in an air oven. However, it has been found that such dielectrically baked cores suffer a loss in strength when exposed to high humidity. This is a particular problem in both storage and in standard founded practice, cores are usually set in wet molding sand so that they must be moisture resistant.

SUMMARY OF THE INVENTION

It has now been found that when sand core and mold compositions containing amine salts of copolymers of acrylic acid and acrylonitrile also contain small amounts of an ammonium salt and glycerine, that when such compositions are dielectrically baked, the resulting cores retain a useful proportion of their strength, even when exposed to 100 percent relative humidity.

DETAILED DESCRIPTION

The preparation and characteristics of salts of copolymers of acrylic acid and acrylonitrile and use thereof in sand cores and molds are disclosed in U.S. Pat. No. 3,007,893, which disclosure is incorporated herein. Further, general principles of making sand core and mold compositions and the method of making cores and molds therefrom is disclosed in U.S. Pat. No. 2,765,507, which disclosure is also incorporated herein.

The bonding copolymers of acrylic acid and acrylonitrile are readily prepared as described in U.S. Pat. No. 3,007,893 and they will normally contain greater than 10 percent by weight of acrylic acid to less than 50 percent by weight of acrylic acid. At least part of the acrylonitrile may be replaced with other monoolefinic monomers having a terminal

group such as styrene, methacrylonitrile, methyl methacrylate and the like. More preferably, the polymers contain about 20 to 40 percent by weight acrylic acid and 60 to 80 percent by weight acrylonitrile. The copolymers are neutralized with water soluble amines as is described in U.S. Pat. No. 3,007,893. Mixtures of amines and mixtures of ammonia and amines may be used to form the amine salts. Polyamines have been found to be very useful. Excellent binders are formed from carboxyl-containing polymers neutralized with aliphatic amines containing 2 to 10 carbon atoms and at least two amine groups. At least about 10 percent of the acrylic acid should be an amine salt, more preferably about 50 percent. The amount of amine salt of the copolymer of acrylic acid and acrylonitrile used will vary from about 0.1 weight part to about five weight parts, per 100 weight parts of sand. A usual range is about 0.25 to two weight parts.

The ammonium compound may be any ammonium salt including, for example, ammonium chloride, ammonium carbonate, ammonium nitrate, ammonium acetate, ammonium sulfate, ammonium bromide, ammonium formate, ammonium iodide, ammonium lactate, ammonium oxalate and the like. The amount used should be greater than 0.01 part per 100 parts of sand and excellent results have been found in the range of about greater than 0.05 to one weight part per 100 of sand, as 0.05 to 0.5.

The amount of glycerine employed in the composition should be greater than 0.1 weight part per 100 weight parts of sand and excellent results have been obtained with about 0.5 to two weight parts of glycerine. Larger amounts of both the ammonium salt and glycerine up to about five parts may be used but are not necessary and larger amounts may contribute to increased water sensitivity.

Any sand may be utilized in the sand core and mold compositions of this invention but there is generally used clean, washed round- or sub-angular grained silica base sand of the general type known as foundry sand. Such sand is available in a wide range of particle sizes containing particles ranging from about 30 to 270 mesh or finer, U.S. series. Such sands usually contain a range of particle sizes and are given a fineness number based on their particle size distribution. In general, the hotter the metal the higher the baked permeability must be in order to dissipate the increased volume of gases generated. Coarser grained sand tends to produce more porous cores while finer sands, of course, favor smooth finish. Consequently the finest grained sand favoring the production of cores having the requisite permeability is usually selected. Specialty sands as olivine, chromite, staurolite, aluminum silicate and zircon may also be used. In addition to naturally-occuring foundry sands it is sometimes advantageous for special purposes to utilize artificially-prepared siliceous materials such as silica flour and other special additives such as wood flour, sawdust, fire clays, bentonites, straw, hay and other fillers, boric acid, iron oxide, sulfuric acid and others.

In general, water is used in the mixtures to impart moldability to the mix and for the development of satisfactory green strength. Satisfactory green strength, moldability and surface finish are obtained in the range of 1.0 to 6 percent or more total moisture. Since too high total moisture content unduly lengthens the baking cycle it is preferred to maintain the total moisture content of the mix in the range of 2.5 to 5 percent. Cereal flour and chemically treated derivatives, as dextrose, in amounts of less than about 3 parts may also be included. It is generally advantageous to add up to 0.1 or 2.0 percent, preferably 0.25 to 0.75 percent of a lubricant such as kerosene, light fuel oil, and other somewhat oily materials in order to insure quick release of the core or mold from the core box, mold or pattern.

In the practice of this invention the dry sand and the acrylic polymer bonding agent may be mixed in any conventional manner. The polymer binder in finely-divided form and additives may be mixed with dry sand to form a composition to which only the correct amount of water need be added before use. Such a dry mixture may be stored almost indefinitely without deleterious effects since the acrylic polymer itself is very stable. Amine salts are highly water-soluble and are usually supplied as water solutions containing from 10 to 35 percent by weight of polymer and the dry sand may be mixed with an aqueous solution of the bonding agent. The binder solution may be diluted to the correct strength to yield directly on admixture with sand a core or mold mix of proper total moisture content.

Intermixing of the sand, acrylic binder, ammonium salt and glycerine may be performed by hand, in an internal mixer, in a paddle-type mixer or in any of the low and high speed mulling machines conventionally utilized in preparing such compositions. No particular care as to order of mixing or of time and temperature of mixing need be exercised since the binding agent is stable. The intermixture of the ingredients of the sand core and mold compositions of this invention may be accomplished by adding the ingredients one at a time, or in any order, or all at once, without effect on core or mold properties with the latter procedure being preferred because of speed and economy. An efficient internal mixer or mulling machine produces a homogeneous composition of this invention in a very short time, usually in from one to two or up to five minutes or less. The resulting green core or mold mix may be stored indefinitely. Any moisture lost during such storage can be easily replaced before use, if desired.

The resulting sand mix is shaped by ramming, jolting, blowing or any combination thereof into a suitable core or mold box, or on a pattern or other shaping device or by shaking or blowing into a hot mold. Cores of difficult or intricate shape may be made in halves and pasted together with a solution of binder or other adhesive. When compacted or shaped in such a manner the core or mold is easily removed from the shaping device.

The operation in which the green core is converted to a hard, dry condition is essentially a dehydrating operation. The core may be dried by heat or air dried at room temperature for a short period before baking in order to allow them to harden slightly and thus insure against damage in subsequent handling. While these compositions are designed for dielectric baking, they may be baked in an air oven.

After the molten metal has been poured in and cooled the core or mold of this invention is easily disintegrated or shaken-out by brushing, blowing, tumbling, pounding or flushing and the casting is ready for use or machining and finishing. The sand thus obtained from the used cores and molds may be reused, for many purposes, simply by remoistening and/or addition of a small amount of make-up binder solution. A large proportion of the binder remaining in the used sand can be removed by washing and the binder can be completely removed by burning and washing processes now in common use in the foundry industry for the reclaiming of sand.

EXAMPLES

A series of sand core compositions were prepared with foundry sand, the components of the compound and amounts in weight parts based on 100 of sand being set forth in the table below. For each run 1000 grams of sand was mixed with 10 grams of cereal flour and, the mixture mulled for ½ minute. Glycerine and 5 grams of water containing 0.1 gram of the indicated ammonium salt (except in the control run 1) and 30 grams of a 15 percent solution of amine salt of a copolymer of about 34 percent acrylic acid and 66 percent acrylonitrile neutralized with equal amounts of ammonia and ethylene diamine as binder were added to the sand mixture which was then mulled for three minutes. Kerosene was then added and the mixtures mulled for another ½ minute. Green core samples were made from the resulting compositions by following the "Procedure for Forming the Core Specimen" in the Foundry Sand Handbook (7th Edition - 1963) p.3 of Section 13. The samples were baked in an oven for 30 minutes at 420° F. or in a Thermax dielectric oven for one minute to two minutes. Tensile strengths were determined by following the "Procedure for Testing Core Specimens" on pages 4–5 of the Foundry Sand Handbook (7th Edition - 1963) on original samples and after 40 hours exposure to 100 percent relative humidity.

| Run | 1 | 2 | 3 | 4 |
|---|---|---|---|---|
| Foundry sand | 100 | 100 | 100 | 100 |
| Cereal flour | 1 | 1 | 1 | 1 |
| Binder | 0.45 | 0.45 | 0.45 | 0.45 |
| NH$_4$Cl | — | 0.1 | 0.1 | — |
| NH$_4$CO$_3$ | — | — | — | 0.1 |
| Glycerine | — | 1 | 0.5 | 0.5 |
| Kerosene lubricant | 0.5 | 0.5 | 1 | 1 |
| Dry tensile strength oven baked (psi) | 442 | 220 | 400 | 400 |
| 100% R.H. tensile strength (oven baked) (psi) | 160 | 92 | 180 | 172 |
| Dry tensile strength (DEB) (psi) | 260 | 394 | 500 | 475 |
| 100% R.H. tensile strength (DEB) (psi) | 28 | 235 | 300 | 350 |
| % Strength retained DEB/oven × 100 | 58.9 | 179 | 125 | 119 |
| % Strength retained at 100% R.H. | 10.8 | 59.7 | 60.0 | 73.7 |

Cores and molds made from these improved compositions are highly useful in the casting of iron, steel, cast iron, gray iron, malleable iron, copper, bronze, aluminum, magnesium and other metals and alloys and particularly in the casting of iron and steel and the light metals such as magnesium, to close tolerances where intricate shapes must be maintained. The sand core composition also is useful in the so-called shell-molding process wherein the sand composition is blown, rammed or shaken into place on a metal pattern or mold (which is sometimes heated) and allowed to stand until a thin layer thereof has hardened on the pattern after which the excess is removed leaving a hollow core or mold of sufficient strength when further baked and suitably supported, to receive the molten metal.

We claim:

1. A sand core and mold composition comprising a mixture of sand, from about 0.1 to about five weight parts of a polymer of acrylonitrile containing greater than 10 to less than 50 percent by weight of acrylic acid, greater than about 0.01 to about one weight part of an ammonium salt and greater than about 0.1 to less than five weight parts of glycerine, all parts based on 100 weight parts of sand, said polymer having at least about 10 percent of the acrylic acid neutralized with an amine.

2. The composition of claim 1 wherein the polymer contains about 20 to 40 percent by weight of acrylic acid, at least about 50 percent of which is an aliphatic amine salt, and the amount of glycerine is from about 0.5 to two weight parts.

3. The composition of claim 2 wherein there is about 0.25 to two weight parts of polymer and the acid is neutralized with ammonia and a diamine.

4. The composition of claim 3 wherein the diamine is ethylene diamine.

5. The composition of claim 4 wherein there is present about 0.1 to 0.5 weight part of ammonium salt and about 0.5 to 1.5 weight parts of glycerine.

6. The composition of claim 5 wherein the ammonium salt is ammonium chloride.

7. The composition of claim 5 wherein the ammonium salt is ammonium carbonate.

* * * * *